US009901934B2

(12) United States Patent
Agache et al.

(10) Patent No.: US 9,901,934 B2
(45) Date of Patent: Feb. 27, 2018

(54) METHOD AND MICROSYSTEM FOR DETECTING ANALYTES WHICH ARE PRESENT IN DROPS OF LIQUID

(75) Inventors: Vincent Agache, Champagnier (FR); Patrice Caillat, Grenoble (FR); Pierre Puget, Saint Ismier (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 1080 days.

(21) Appl. No.: 13/984,964

(22) PCT Filed: Feb. 11, 2011

(86) PCT No.: PCT/EP2011/052025
§ 371 (c)(1),
(2), (4) Date: Sep. 25, 2013

(87) PCT Pub. No.: WO2012/107101
PCT Pub. Date: Aug. 16, 2012

(65) Prior Publication Data
US 2014/0008224 A1 Jan. 9, 2014

(51) Int. Cl.
*G01N 27/26* (2006.01)
*B03C 5/00* (2006.01)
*B03C 5/02* (2006.01)
*G01F 1/64* (2006.01)

(52) U.S. Cl.
CPC .............. *B03C 5/005* (2013.01); *B03C 5/026* (2013.01); *B03C 2201/26* (2013.01)

(58) Field of Classification Search
None
See application file for complete search history.

(56) References Cited

U.S. PATENT DOCUMENTS

| | | | | |
|---|---|---|---|---|
| 2003/0007898 | A1* | 1/2003 | Bohm | B01D 57/02 422/504 |
| 2004/0091398 | A1* | 5/2004 | Gilbert | B01D 57/02 422/504 |
| 2006/0108224 | A1 | 5/2006 | King et al. | |
| 2006/0226012 | A1* | 10/2006 | Kanagasabapathi | B03C 5/028 204/547 |

(Continued)

FOREIGN PATENT DOCUMENTS

| | | |
|---|---|---|
| WO | 2009 141515 | 11/2009 |

OTHER PUBLICATIONS

Kim, Ho-Young et al, "Sliding of Liquid Droplets Down an Inclined Solid Surface," 2002, Journal of Colloid and Interface Science, 247, 372-380.*

(Continued)

*Primary Examiner* — Jill Warden
*Assistant Examiner* — Brittany Fisher
(74) *Attorney, Agent, or Firm* — Oblon, McClelland, Maier & Neustadt, L.L.P.

(57) ABSTRACT

A detection method of detecting analytes of interest which are present in a liquid. The detection method including the steps of forming drops of liquid on a first surface by capillary breaking of a finger of liquid, which is initially formed by liquid dielectrophoresis. The thus formed drops each come into contact with a different detection surface, which is arranged facing the first surface. Analytes of interest which are present in each of the drops are detected at the corresponding detection surface.

25 Claims, 7 Drawing Sheets

(56) References Cited

U.S. PATENT DOCUMENTS

| | | | | |
|---|---|---|---|---|
| 2006/0231398 | A1* | 10/2006 | Sarrut | B01D 11/04 204/450 |
| 2007/0045117 | A1* | 3/2007 | Pamula | B01F 13/0071 204/600 |
| 2009/0195120 | A1* | 8/2009 | Knospe | B81B 3/0021 310/300 |
| 2009/0311713 | A1* | 12/2009 | Pollack | B01L 3/502792 435/287.2 |
| 2009/0321262 | A1* | 12/2009 | Adachi | B01F 13/0071 204/600 |
| 2010/0307917 | A1* | 12/2010 | Srinivasan | B01L 3/0268 204/450 |
| 2010/0320088 | A1* | 12/2010 | Fouillet | B01F 3/0807 204/454 |
| 2011/0138891 | A1 | 6/2011 | Agache et al. | |
| 2013/0112559 | A1 | 5/2013 | Renaudot et al. | |

OTHER PUBLICATIONS

Jones, T.B., "Liquid Dielectrophoresis on the microscale," 2001, Journal of Electrostatics 51-52, 290-299.*

T. B. Jones et al., "Liquid Dielectrophoresis on the Microscale", Journal of Electrostatics, 51-52, 2001, pp. 290-299.

Ahmed, R. et al., "Optimized liquid DEP droplet dispensing", Journal of Micromechanics and Microengineering, vol. 17, No. 5, pp. 1052-1058, XP020120103, (May 1, 2007).

Jones, T. B. et al., Dielectrophoretic liquid actuation and nanodroplet formation, Journal of Applied Physics, vol. 89, No. 2, pp. 1441-1448, XP012052805, (Jan. 15, 2001).

King, M. R. et al., "Size-selective deposition of particles combining liquid and particulate dielectrophoresis", Journal of Applied Physics, vol. 97, No. 5, pp. 054902-1-054902-7, XP012070793, ( Feb. 8, 2005 ).

International Search Report dated Nov. 7, 2011 in PCT/EP11/052025 filed Feb. 11, 2011.

* cited by examiner

METHOD AND MICROSYSTEM FOR DETECTING ANALYTES WHICH ARE PRESENT IN DROPS OF LIQUID

TECHNICAL FIELD

The present invention concerns the general field of detection of analytes of interest which are present in a liquid of interest.

These analytes of interest can be chemical and/or biological targets, e.g. macromolecules, cells, organelles, pathogens or intercalations.

PRIOR ART

In numerous fields, attempts are being made to detect analytes of interest of the chemical and/or biological type which may be present in a drop of liquid.

This may be the case, for example, to establish a biological or medical diagnosis, or in the fields of genetic engineering or the food industry. Attempts may be made to detect or measure out, in particular, macromolecules, cells, organelles, pathogens or intercalations.

Usually, attempts are made to analyse liquid samples of low volume in reduced time, in the simplest and least intrusive possible way.

As an illustration, biochips, which form, in the field of molecular biology, microsystems for analysing the hybridization of nucleic acids (DNA and/or RNA), or interactions of the type of antigen/antibody, protein/ligand, protein/protein, enzyme/substrate, etc., may be cited. Attempts may be made to obtain kinetic parameters or equilibrium constants associated with these chemical interactions.

In general, analytes of interest which are of the biological and/or chemical type can be detected using a sensor in a microchannel, within which the liquid sample to be analysed circulates. Several detection techniques can be used, such as detection by gravimetry and detection by field effect.

Patent application WO2009/141515, which was filed in the name of the applicant, describes a device for gravimetric detection of particles in a fluid medium, in particular biomolecules. The device includes an electromechanical oscillator, the vibration frequency of which depends on the quantity of analytes of interest which are deposited on the surface of the oscillator.

More precisely, the device includes a microchannel, in which a liquid including the analytes of interest circulates. Inside the microchannel, a plane electromechanical oscillator is arranged, in the form of, for example, a square plate. One of the faces of the plate defines an analyte detection surface, the functioning of which can be obtained by prior grafting of probes which are capable of binding to the analytes of interest.

The oscillator is kept in position, and able to vibrate in its plane, by beams which are arranged at the four apices of the plate, and each connected to the substrate in which the microchannel is formed.

The means of actuating the oscillator can include two adjacent electrodes which are arranged near the plate and coplanar therewith. The oscillator is made to vibrate, at its natural frequency of resonance, by electrostatic coupling, via the two actuating electrodes. To do this, the oscillator is brought to a constant electrical potential.

The detection means include at least one electrode which is arranged near the plate and facing said actuating electrodes. Modulating the capacitance between the oscillator and the measuring electrode, because of the vibration of the oscillator, generates a capacitive current, called a motional current, at said electrode.

By measuring this current, and in particular its spectral response, the vibration frequency of the oscillator, and then the divergence between the effective vibration frequency of the oscillator and the initial frequency, are deduced. The mass of the analytes of interest which are deposited on the detection surface of the oscillator is directly correlated with this frequency divergence.

However, this detection device by gravimetry according to the prior art has some disadvantages.

Thus the concentration of analytes of interest in the liquid sample is greatly affected by the hydrodynamic forces which are present in the flow of liquid within the microchannel. In fact, the usually micrometric dimensions of the microchannel make the viscosity forces particularly high. The analytes which are present near the walls, and in particular the edges, of the microchannel are then virtually held back by the viscosity forces, which tends to reduce the concentration of analytes which are routed effectively to the sensor.

Additionally, the walls of the microchannel are likely to include chemical elements which can contaminate the liquid of interest, and possibly interact with the analytes upstream from the sensor, or with the probe elements of the detection surface, which may interfere with the detection sensitivity of the sensor.

Additionally, the plate is immersed in the liquid of interest. Also, the liquid is present, in particular, in the vibration zone of the plate, i.e. between the plate and the lateral electrodes in the case of transduction by capacitive coupling, which results in damping of the vibrations, called "squeeze damping", to which viscous damping is added, both of which greatly degrade the quality factor of the sensor. The quality factor of such a sensor usually corresponds to the fineness of its resonance peak. Additionally, it is known that the quality factor is correlated with the sensitivity of detection. In other words, the finer a resonance peak is, the more the quality factor will be increased, and the more the sensitivity of detection of the sensor will be increased. The quality factor is commonly determined by the width, at mid-height, of the resonance peak in a graph representing the vibration amplitude as a function of the vibration frequency. However, any other indicator corresponding to the fineness of a resonance peak can be used.

Additionally, in the case of gravimetric sensors with capacitive transduction which are immersed in the liquid of interest, it is necessary to cover the faces of the actuating and detecting electrodes with an insulating layer. In fact, in the absence of this layer, there is a risk of electrolysis when the liquid of interest is conductive. On the other hand, the presence of this insulating layer makes it necessary to increase the actuating voltages to obtain the same oscillation amplitude.

SUMMARY OF THE INVENTION

The object of the invention is to present a method of detecting analytes of interest which are present in a liquid, at least partly overcoming the above-mentioned disadvantages in relation to the implementation of the prior art.

For this purpose, the invention relates to a method of detecting analytes of interest which are present in a liquid of interest, including the following steps:

- said liquid of interest is put into contact with a first surface, said surface being parallel to at least one detection surface;

a finger of liquid is formed on said first surface by liquid dielectrophoresis, under the effect of an electrical control, the finger of liquid extending along two approximately coplanar movement electrodes which are arranged on said first surface, said electrodes including at least one drop formation zone facing said at least one detection surface;

the electrical control is stopped, so that the finger of liquid breaks by capillarity, generating at least one drop on one of said drop formation zones, said at least one drop having sufficient thickness to come into contact with said at least one detection surface;

said analytes of interest which are present in said at least one drop are detected by detection means working with said at least one detection surface.

Liquid dielectrophoresis (LDEP) is understood to be the application of an electrical force to an electrically insulating or conducting liquid, the force being generated by a non-uniform oscillating electrical field. The formation of a finger of liquid by liquid dielectrophoresis is described, in particular, in the article by Jones entitled "Liquid dielectrophoresis on the microscale", J. Electrostat., 51-52 (2001), 290-299. When the liquid is in an electrical field, the molecules of the liquid acquire a non-null dipole and are polarised. To the extent that the field is non-uniform, a Coulomb force appears, and induces the movement of the molecules of the liquid, and thus of all the liquid, towards a field maximum.

It should be noted that when the electrical control is stopped, the finger of liquid is of unstable form. Capillary instability then develops rapidly, and causes the finger to break into one or more drop(s), which makes it possible to lower the surface energy of the liquid.

The method according to the invention thus provides the detection of analytes of interest which are present in a drop of liquid in contact with the detection surface. The method also makes it possible to form multiple drops simultaneously. The drops can come into contact with a single detection surface or distinct detection surfaces.

In contrast to the prior art mentioned above, the analytes are no longer carried by a liquid flowing in a microchannel, but by a finger of liquid in contact with the first surface. The influence of viscous forces is thus greatly reduced, to the extent that the total surface of wetted wall is appreciably reduced. The quantity of analytes "trapped" near the walls, here the first surface, is thus appreciably less, which increases the quantity of analytes which are carried effectively to the detection surface.

Additionally, by reducing the total surface of wetted wall, the risk of contaminating the liquid of interest by contact with a contaminated surface is greatly reduced. Additionally, the detection surface is in contact with the liquid only when a drop comes to cover it, which appreciably reduces the risk of contaminating the detection surface by interfering chemical elements.

Additionally, in the case of an electromechanical oscillator as described above, one face of which forms a detection surface, the absence of liquid in the vibration zone makes it possible to avoid the damping of the vibrations, of the "squeeze damping" type. The quality factor is then preserved.

In the case that multiple drops are formed simultaneously from the finger of liquid, and come into contact with multiple detection surfaces at one drop per surface, said detection surfaces can be used to detect different categories of analytes, thus making it possible to detect, precisely and rapidly, a large number of analytes of different categories.

It should be noted that when the liquid of interest is surrounded by a gas, actuation of one detection surface does not influence detection at an adjacent detection surface, to the extent that the different corresponding oscillators are not immersed in a liquid. Only the gas is present in the vibration zone of each oscillator, when the latter vibrates in its plane. If it vibrates outside its plane, only the drop on the corresponding detection surface is deformed, without this interfering with the vibrations of an adjacent oscillator.

Preferably, said movement electrodes are approximately rectilinear, coplanar and approximately parallel to each other.

Said first surface and said at least one detection surface are separated from each other by a height greater than the maximum thickness of the finger of liquid and less than the maximum thickness of said at least one drop of liquid.

Thus the finger of liquid is formed on the first surface, without touching said at least one detection surface. When at least one drop is generated by capillary breaking of the fluid finger, it naturally comes into contact with the detection surface, to the extent that the drop has a maximum thickness which is greater than the distance which separates the two surfaces.

Advantageously, the probe elements which are capable of binding to the analytes of interest are grafted onto said at least one detection surface, in such a way as to cover it at least partly.

These grafted probe elements can be, for example, antibodies, probes for nucleic acids or printed polymers.

According to one embodiment, said liquid movement electrodes include multiple drop formation zones, which are each arranged facing a distinct detection surface. When the electrical control stops, the finger of liquid breaks into multiple drops, each situated on one of said drop formation zones, each drop coming into contact with the corresponding detection surface.

The drop formation zones can correspond to outgrowths of the coplanar electrodes. Preferably, these outgrowths are in the form of half-discs.

Thus the method makes it possible to form multiple drops. The drops are formed simultaneously, and come into contact with the corresponding detection surface simultaneously.

Additionally, the placement of the drops is perfectly controlled, to the extent that each drop is formed on the drop formation zone of the movement electrodes.

Additionally, the drops all have a calibrated volume. It is possible that each drop has an identical volume.

The volume of each drop depends on the size, and in particular the width, of the drop formation zones, the width of the finger of liquid, and the hydrophilic character of the first surface.

When the fluid finger is formed on a first surface facing the detection surface, the volume of the drop also depends on the distance which separates the first surface and the detection surface.

The width of the fluid finger is approximately equal to the distance 2R between the rectilinear parts of the outer edges of the movement electrodes.

Each detection surface can include probe elements which are capable of binding to different analytes of interest according to the detection surfaces being considered. It is then possible to proceed with detection of analytes of different categories, according to the type of probe elements.

According to another embodiment, said liquid movement electrodes include multiple drop formation zones, which are arranged facing the same detection surface. When the electrical control stops, the finger of liquid breaks into multiple drops, each situated on one of said drop formation zones, each drop coming into contact with said corresponding detection surface.

As before, the drops are formed simultaneously, and have a calibrated volume. The volume of each drop can also be identical.

Advantageously, said movement electrodes each include inner and outer edges, the inner edges being arranged approximately facing each other, and the outer edges having approximately rectilinear parts.

Said rectilinear parts are separated from each other by a distance 2R, and the drop formation zones are separated from each other by a distance which advantageously is between eight and ten times the distance R, and preferably of the order of nine times the distance R, and preferably 9.016R.

This distance is approximately equal to the most unstable wavelength of the finger of liquid.

According to one embodiment, said liquid movement electrodes include a single drop formation zone which directly faces a single detection surface. When the electrical control stops, the finger of liquid breaks into a single drop, situated on said drop formation zone, said drop coming into contact with said detection surface.

Preferably, said movement electrodes are covered with a dielectric layer.

Preferably, said first surface is hydrophobic, and said at least one detection surface is at least partly hydrophilic.

According to a first preferred embodiment of the invention, said detection surface is a face of a plane electromechanical oscillator which is capable of vibrating.

Said detection step can then include the following substeps:

- the oscillator is set to vibrate at a predetermined frequency and according to a predetermined vibration mode;
- the effective vibration frequency of the oscillator is measured;
- a divergence between the measured vibration frequency and the predetermined vibration frequency is calculated.

This divergence is due to the mass of the drop which is deposited on the detection surface. When the detection surface is made functional with specific probes, the divergence is also due to the interactions between the targets which are present in the liquid of interest and the probes. The term "gravimetric detection" can also be used.

Preferably, at least one actuating electrode is arranged facing the edge of said oscillator, preferably parallel to the latter, and advantageously coplanar with the latter. Said setting of the oscillator to vibrate is implemented by electrostatic coupling between the oscillator and said at least one actuating electrode, by generating an alternating electrical field between said oscillator and said at least one actuating electrode.

Said oscillator can thus be brought to a constant electrical potential, and an alternating electrical voltage can be applied to said at least one actuating electrode.

A measuring electrode is arranged facing the edge of said oscillator, preferably parallel to the latter, and advantageously coplanar with the latter. Said step of measuring the vibration frequency of the oscillator includes measuring an electric current circulating from said measuring electrode, said electric current being generated by capacitive coupling between the oscillator and said measuring electrode. Several measuring electrodes can be arranged, these measuring electrodes then being coupled capacitively to the oscillator.

Alternatively, analytes of interest are detected by piezoelectricity. Said at least one detection surface includes a layer of an electrically conducting material which forms a reference electrode, and is covered with a layer of a dielectric piezoelectric material, the latter being covered at least partly by at least one measuring electrode. Said step of measuring the vibration frequency of the oscillator includes measuring an electric current circulating from said measuring electrode, said electric current being generated by capacitive coupling between the reference electrode and the measuring electrode, the latter being brought to a given electrical potential by polarisation of the piezoelectric layer because of the vibration of the oscillator.

According to a variant, said piezoelectric layer is covered at least partly by two measuring electrodes, each formed of a metallic track and arranged approximately parallel to each other. Said step of measuring the vibration frequency of the oscillator also includes measuring a second electric current from at least one of said measuring electrodes, said second electric current being generated by capacitive coupling between said measuring electrodes.

Alternatively, analytes of interest are detected by a technique according to which the oscillator forms a resonant electrical grid. An electrode forming a channel is arranged facing the edge of said oscillator, preferably parallel to the latter, and advantageously coplanar with the latter, said electrode forming a channel being connected to an electrode forming a source, which is brought to a first constant electrical potential, and to an electrode forming a drain, which is brought to a second electrical potential. Said step of measuring the vibration frequency of the oscillator includes measuring the variations of the electric current which circulates in the electrode forming a channel, said variations being induced by field effect between the oscillator and the electrode forming a channel.

Alternatively, analytes of interest are detected by a detection technique by field effect, according to which the oscillator forms a resonant electrical channel. Said oscillator is an electrode forming a channel, and is connected to an electrode forming a source, which is brought to a first constant electrical potential, and to an electrode forming a drain, which is brought to a second electrical potential. Said step of measuring the vibration frequency of the oscillator includes measuring the variations of the electric current which circulates in the electrode forming a channel, said variations being induced, by field effect, by analytes of interest being deposited on the detection surface of the oscillator.

Advantageously, said at least one detection surface has a hydrophilic zone which is intended to be covered by said at least one drop, the outline of the hydrophilic zone coinciding approximately with the nodal lines of the oscillator according to the vibration mode in which it is stressed.

According to a preferred second embodiment of the invention, said detection surface includes multiple nanowires, each connected to an electrode forming a source, to which a direct voltage is applied, and to an electrode forming a drain, to which a direct voltage is applied. Said step of detecting analytes of interest includes measuring the variations of the electric current which circulates in said nanowires, said variations being induced, by field effect, by analytes of interest being deposited on said detection surface.

The invention also concerns a method of detecting analytes of interest which are present in a liquid of interest, including the following steps:

said liquid is put into contact with a principal surface formed of a surface of a substrate, a surface of a plane detector forming a detection surface and a surface of means of supporting the oscillator relative to said substrate;

a finger of liquid is formed on said principal surface by liquid dielectrophoresis, under the effect of an electrical control, the finger of liquid extending along two movement electrodes which are arranged on said principal surface, said electrodes including at least one drop formation zone, each located on said detection surface of the detector;

the electrical control is stopped, so that the finger of liquid breaks by capillarity, generating at least one drop on one of said drop formation zones;

said analytes of interest which are present in said at least one drop are detected by electrical detection means working with said at least one detection surface.

In contrast to the previously described method, here the surface on which the finger of liquid is formed and the at least one detection surface are coplanar.

Advantageously, the probe elements which are capable of binding to the analytes of interest are grafted onto said at least one detection surface, in such a way as to cover it at least partly.

Said detection surface is a face of a plane electromechanical oscillator which is capable of vibrating. Said detection step can then include the following substeps:

the oscillator is set to vibrate at a predetermined frequency and according to a predetermined vibration mode;

the effective vibration frequency of the oscillator is measured;

a divergence between the measured vibration frequency and the predetermined vibration frequency is calculated.

This divergence is due to the mass of the drop which is deposited on the detection surface. When the detection surface is made functional with specific probes, the divergence is also due to the interactions between the targets which are present in the liquid of interest and the probes. The term "gravimetric detection" can also be used.

Preferably, at least one actuating electrode is arranged facing the edge of said oscillator, preferably parallel to the latter, and advantageously coplanar with the latter. Said setting of the oscillator to vibrate is implemented by electrostatic coupling between the oscillator and said at least one actuating electrode, by generating an alternating electrical field between said oscillator and said at least one actuating electrode. For example, the oscillator is brought to a constant electrical potential, and an alternating electrical voltage is applied to said at least one actuating electrode.

A measuring electrode is arranged facing the edge of said oscillator, preferably parallel to the latter, and advantageously coplanar with the latter. Said step of measuring the vibration frequency of the oscillator includes measuring an electric current circulating from said measuring electrode, said electric current being generated by capacitive coupling between the carried oscillator and said measuring electrode.

The oscillators described above (piezoelectric oscillators, oscillators with a resonant grid or resonant channel) can also be used in this embodiment.

The invention also concerns a device for detecting analytes of interest, to implement the detection method with a non-coplanar drop formation surface and detection surface, according to one of the above characteristics. The detection device includes:

a first surface and at least one detection surface, said first surface being parallel to said at least one detection surface and arranged at a determined distance from the latter;

a tank of liquid of interest, arranged so that said liquid can be put into contact with said first surface;

electrical means of forming, by liquid dielectrophoresis, a finger of liquid from said tank on the first surface, said electrical means including two approximately coplanar movement electrodes which are arranged on said first surface and include at least one drop formation zone facing said at least one detection surface;

means of detecting analytes of interest in a drop of said liquid in contact with said at least one detection surface, said detection means working with said at least one detection surface.

Finally, the invention also concerns a device for detecting analytes of interest, to implement the detection method with a coplanar drop formation surface and detection surface, according to one of the above characteristics. The detection device includes:

a substrate, at least one plane electromechanical oscillator, and means of supporting each oscillator relative to said substrate, a principal surface being formed of a surface of said substrate, a surface of said oscillator forming a detection surface and a surface of said means of support;

a tank of liquid of interest, arranged so that said liquid can be put into contact with said principal surface;

electrical means of forming, by liquid dielectrophoresis, a finger of liquid from said tank on the principal surface, said electrical means including two approximately coplanar movement electrodes which are arranged on said principal surface and include at least one drop formation zone each located on said detection surface;

means of detecting analytes of interest in a drop of said liquid in contact with said at least one detection surface, said detection means working with said at least one detection surface.

Other advantages and characteristics of the invention will appear in the non-limiting detailed description below.

BRIEF DESCRIPTION OF THE DRAWINGS

Embodiments of the invention will now be described, as non-limiting examples, referring to the attached drawings, in which.

DETAILED PRESENTATION OF A PREFERRED EMBODIMENT

Figure 1:
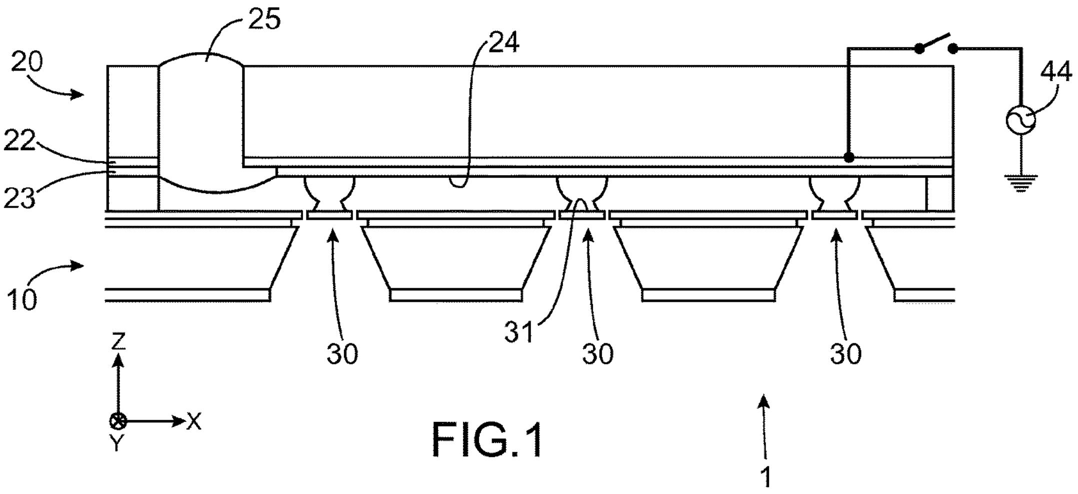
FIG. 1 is a schematic view in longitudinal cross-section of a detection device according to the first preferred embodiment of the invention, in which the detection technique is gravimetric.

FIG. 1 shows a device for detecting analytes of interest which are present in a liquid, according to a first embodiment of the invention.

The detection device 1 includes a lower substrate 10 and an upper substrate 20 forming a cover, arranged facing each other.

The cover 20 has a lower face formed of a dielectric layer 22 and a hydrophobic layer 23. The free surface of said hydrophobic layer is called the first surface 24.

The lower substrate 10 includes multiple electromechanical oscillators 30, which are capable of being set to vibrate. Said oscillators 30 are described in detail below. The upper face 31 of each oscillator is called the detection surface 31, and faces the first surface 24 of the cover 20.

In all the description below, by convention a direct orthonormal frame in Cartesian co-ordinates (X, Y, Z) is used, as shown in FIG. 1. The plane (X, Y) is parallel to said surfaces, and the direction Z is oriented from the detection surfaces 31 to the first surface 24 of the cover.

The terms "upper" and "lower" should be understood here in terms of orientation following the direction Z of said frame.

Said detection surfaces 31 are coplanar, and separated from the first surface 24 by a determined distance H.

The cover 20 includes an aperture 25 which passes through and opens into the first surface 24. The aperture 25 can be filled with liquid, in which analytes of interest may be present, thus forming a liquid tank 25.

The liquid has an electrical conductivity of the order of a few $\mu S \cdot cm^{-1}$ to a few $mS \cdot cm^{-1}$, e.g. between 1 $\mu S \cdot cm^{-1}$ and 100 $mS \cdot cm^{-1}$, preferably of the order of 10 $mS \cdot cm^{-1}$.

The detection device 1 includes electrical means of forming a finger of liquid by liquid dielectrophoresis on the first surface 24 of the cover 20.

These means are similar to those which are presented in the article by Ahmed and Jones entitled "Optimized liquid DEP droplet dispensing", J. Micromech. Microeng., 17 (2007), 1052-1058.

Figure 2A:
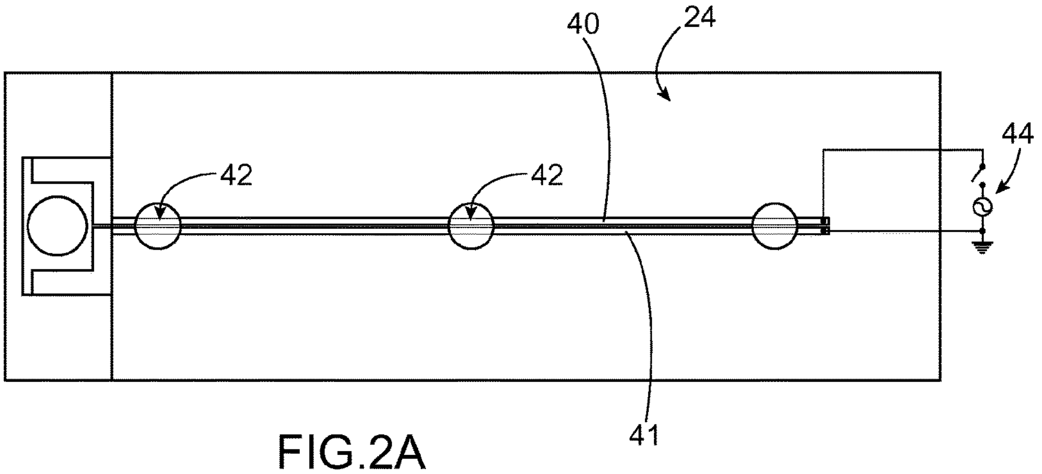
FIG. 2A is a schematic view from below of the substrate forming a cover of the device shown in FIG. 1, the cover being equipped with two movement electrodes.
Figure 2B:
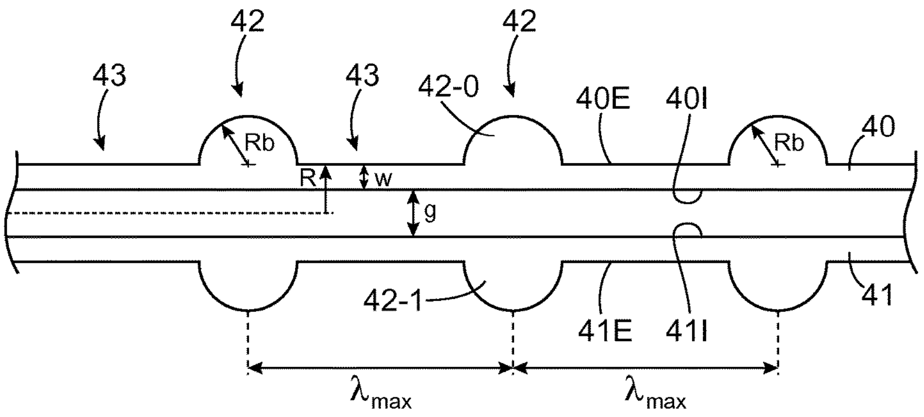
FIG. 2B is a detailed view of part of the movement electrodes shown in FIG. 2A.

Thus, as FIGS. 2A and 2B show, two movement electrodes 40, 41 are arranged on the first surface 24, and include multiple drop formation zones 42, each facing a different detection surface.

The electrodes 40, 41 are each formed of a metallic track. They are parallel to each other, coplanar and approximately rectilinear.

As FIG. 2B shows more precisely, each track 40, 41 includes an inner edge 40I, 41I and an outer edge 40E, 41E. The inner edges 40I, 41I are arranged facing each other.

Said drop formation zones 42 are formed of plane protuberances or plane bumps 42-0 and 42-1, which extend to the outside of each movement electrode 40, 41. The bumps 42-0 and 42-1 are part of the electrodes 40, 41 and are coplanar with them.

The bumps 42-0 and 42-1 here are arranged symmetrically in relation to each other, and each belong to a different movement electrode 40, 41.

Thus the movement electrodes 40, 41 include rectilinear parts 43 and drop formation zones 42, which are connected to each other by said rectilinear parts 43.

The inner edges 40I, 41I of the movement electrodes 40, 41 are separated from each other by a distance g. The rectilinear parts 43 have a width w, and each bump 42-0, 42-1 is a half-disc of radius Rb, the centre of which is located in the continuation of the outer edge 40E, 41E of the rectilinear parts 43. The notation of these various distances is similar to what is used in the article by Ahmed and Jones cited above.

2R is the distance separating the outer edges 40E, 41E of the rectilinear parts 43 of the movement electrodes 40, 41.

The drop formation zones 42 are arranged equidistantly from each other, the distance preferably being between 8R and 10R, and preferably 9.016R.

As is explained in detail below, the distance which separates the drop formation zones 42 is approximately equal to the most unstable wavelength $\lambda_{max}$ of the finger of liquid which extends along the movement electrodes 40, 41.

The movement electrodes 40, 41 are connected to a voltage generator 44 (FIG. 2A), which makes it possible to apply a potential difference between the electrodes 40, 41.

The voltage which is applied is an alternating voltage, the frequency of which is, for example, between a few kilohertz and a few megahertz, e.g. between 10 kHz and 10 MHz, and between 10 kHz and 100 kHz, and of a preferred voltage of a few RMS volts to a few hundred RMS volts.

Finally, as mentioned above with reference to FIG. 1, a dielectric layer 22 is arranged in such a way as to cover the lower face 21 of the cover 20 and the movement electrodes 40, 41. A hydrophobic layer 23 covers the dielectric layer 22. Advantageously, the dielectric layer and the hydrophobic layer can be a single layer of the same material.

The lower substrate 10 includes multiple detectors, in the form of plane electromechanical oscillators 30 which are capable of being set to vibrate (FIG. 1). Each oscillator 30 has an upper face called a detection surface 31.

The detection surfaces 31 are coplanar with and separated by a distance H from the first surface 24 of the cover 20.

The oscillators 30 can be similar or identical to those described in the international application WO2009/141515 cited above, or any other gravimetric detector known to the person skilled in the art (beams, cantilevers etc.).

Figure 3:
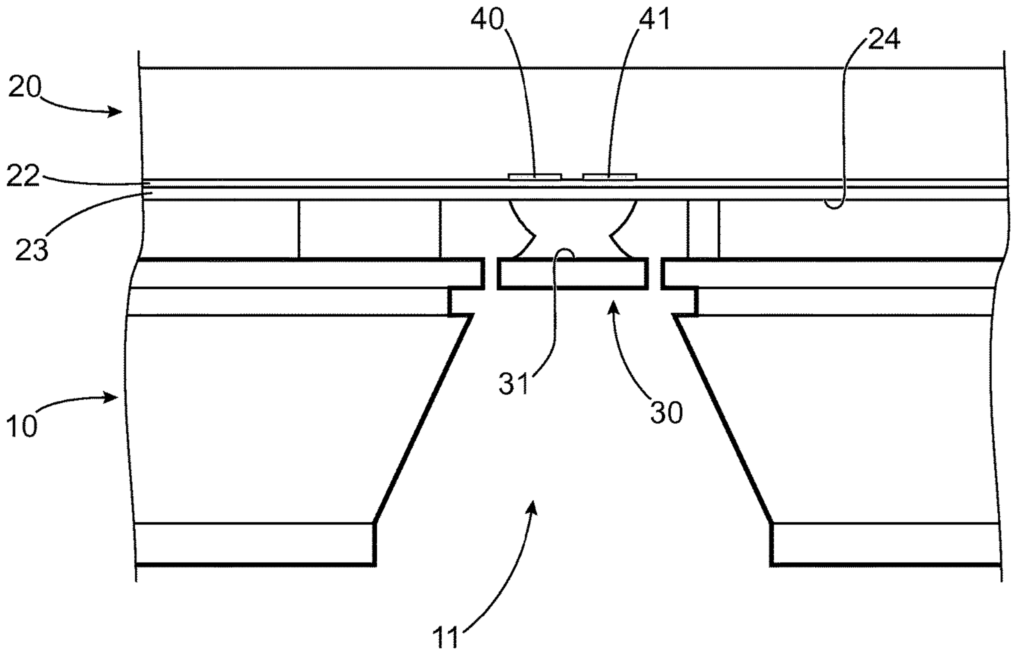
FIG. 3 is a detailed schematic view in transverse cross-section of part of the detection device shown in FIG. 1.

As FIG. 3 shows, each oscillator 30 here is a square plate which is arranged directly facing a drop formation zone 42 of the movement electrodes 40, 41. However, it can be in other forms, e.g. a disc, a ring or a polygon.

The plate 30 is arranged above a cavity 11, which enables it to vibrate in and out of its plane.

Figure 4A:
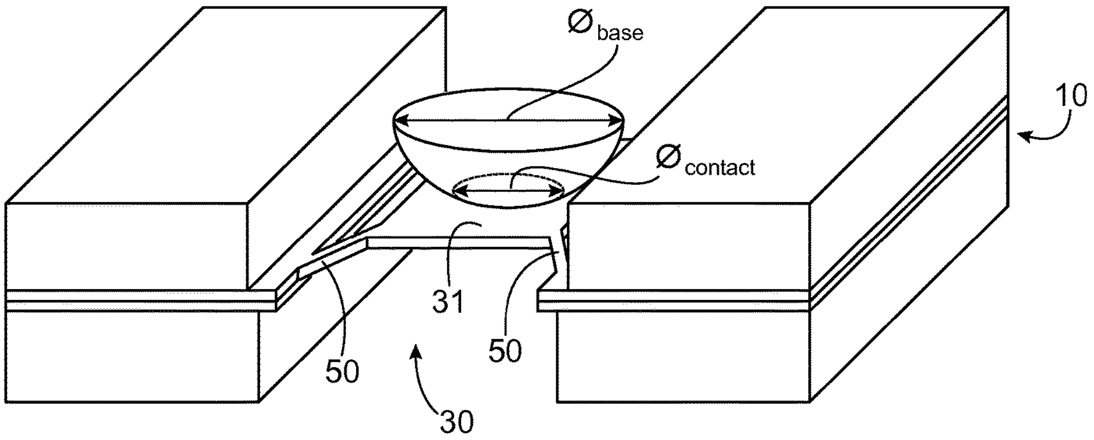
FIG. 4A is a schematic perspective view of part of the detection device shown in FIG. 1.
Figure 4B:
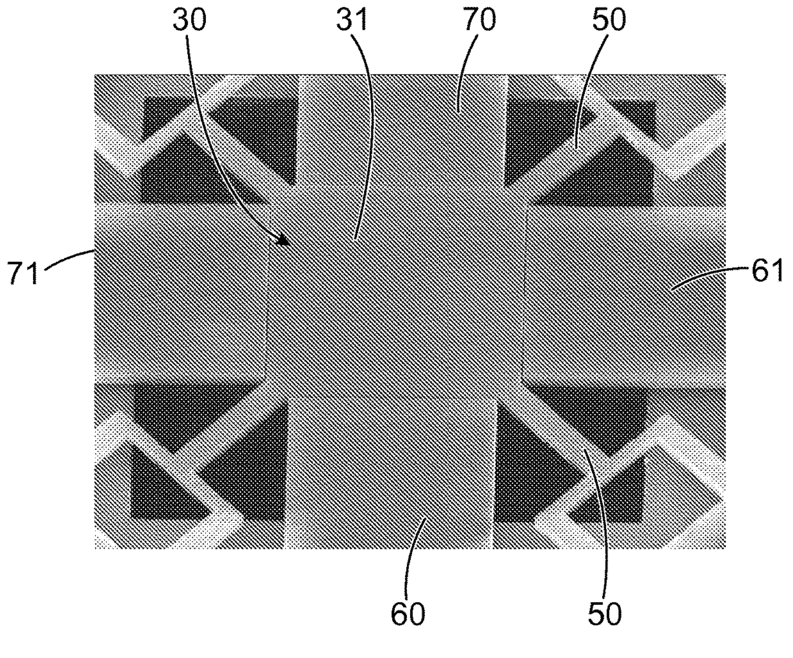
FIG. 4B is a schematic plan view of the plane electromechanical oscillator, which is surrounded by actuating electrodes and measuring electrodes, of the part of the detection device shown in FIG. 4A.

As FIGS. 4A and 4B show, the plate 30 is mounted on the lower substrate by support means 50, here beams, which are distributed at the four apices of the oscillator and oriented following the diagonals of the latter. These beams can be, for example, of silicon, polysilicon, tungsten, nickel or any other material which is used in the field of micro-electromechanical or nano-electromechanical systems (MEMS, NEMS).

Actuating means are provided to set each oscillator to vibrate.

At least one actuating electrode 60 is arranged facing the edge of said oscillator 30, preferably parallel to the latter, and advantageously coplanar with the latter.

FIG. 4B shows two adjacent actuating electrodes 60, 61 which are arranged near the oscillator 30.

The actuating electrodes 60, 61 are separated from the oscillator 30 by a distance of the order of a few hundred nanometers, e.g. 100 nm or 300 nm.

A voltage generator (not shown) is connected to the actuating electrodes 60, 61, to apply to each of them an alternating electrical voltage of determined frequency, and the oscillator 30 is brought to a constant electrical potential. Control means (not shown) are connected to the voltage generator, for choosing the parameters of the voltage to be set. The frequency of the applied voltage is advantageously equal to the natural resonant frequency of the oscillator.

It should be noted that the oscillator 30 can vibrate, preferably in its plane, according to a predetermined vibration mode chosen from Lamé mode, volume extension mode or the mode called "wine glass", or any other mode of outline.

As described in detail below, the oscillator 30 is set to vibrate by electrostatic coupling between the oscillator 30, which is brought to a constant electrical potential, and said actuating electrodes 60, 61, to which an alternating electrical voltage of predetermined frequency is applied.

The analytes of interest are detected here by gravimetry.

As FIG. 4B shows, two adjacent measuring electrodes 70, 71 are arranged facing the edge of said oscillator 30, preferably parallel to the latter, and advantageously coplanar with the latter. They have the same distance separating them from the oscillator 30 as the actuating electrodes 60, 61.

As described in detail below, said step of measuring the vibration frequency of the oscillator includes measuring an electric current which circulates from said measuring electrodes 70, 71. This electric current is generated by capacitive coupling between the oscillator 30 and the measuring electrodes 70, 71.

Finally, the means (not shown) of storing and analysing the measured electrical signals are connected to the means of measuring the generated electric current and the means of controlling the actuating electrodes. They make it possible to calculate the effective vibration frequency of the oscillator on the one hand, and to detect the analytes of interest from a divergence between the measured vibration frequency and the initially set predetermined vibration frequency.

It should be noted that the detection surface 31 of the oscillator 30 advantageously has a hydrophilic zone, which is intended to be covered by said drop. The outline of the hydrophilic zone can advantageously coincide approximately with the nodal lines of the oscillator according to the vibration mode in which it is stressed. This makes it possible to attenuate the energy dissipation caused by the vibration of the triple line of the drop, this vibration then being of negligible amplitude.

Additionally, the probe elements which are capable of binding to the analytes of interest can be grafted onto said detection surface, in such a way as to cover it at least partly. These grafted probe elements can be, for example, antibodies, probes for nucleic acids or printed polymers.

The probe elements can be different according to the detection surfaces. Thus each detection surface is intended to receive a different category of analytes of interest.

The lower substrate 10 can be implemented in a material such as monocrystalline silicon, polycrystalline silicon, diamond, silicon nitride, silicon oxide, nickel, tungsten or platinum. The material of the upper substrate 20 can be chosen from among the above-mentioned materials, but glass, pyrex or an organic material such as polycarbonate or PEEK will be preferred. The upper substrate will advantageously be transparent. The thickness of the upper substrate can be between a few hundred microns and a few millimeters.

The movement electrodes 40, 41 are implemented in a metallic material, e.g. gold or aluminium. The electrodes 40, 41 can have a width w of the order of 20 μm, and be separated from each other by a distance g of the order of 20 μm. The width of the finger of liquid will thus be of the order of $R=w+g/2=30$ μm. The bumps can be half-discs of radius $Rb=0.98R$.

The dielectric layer 22 which covers the movement electrodes 40, 41 can be, for example, of $SiO_2$, $Al_2O_3$, $HfO_2$, SiN, and have a thickness between 100 nm and a few microns. It makes it possible to avoid the electrolysis of the liquid if the latter was in direct contact with the movement electrodes 40, 41.

The hydrophobic layer 23 which forms the first surface 24 can be of SiOC, PTFE (polytetrafluoroethylene) or parylene, and have a thickness of a few microns.

The oscillator 30 is a square plate of width between 5 μm and a few hundred microns. Its thickness is typically less than or equal to a tenth of its width. It is implemented in a material which is chosen from monocrystalline silicon, polycrystalline silicon, diamond, silicon nitride, silicon oxide, nickel, tungsten or platinum.

The distance H which separates the first surface 24 and the detection surfaces 31 can be of the order of a few tens of microns, e.g. 50 μm.

Each detection surface 31 has a hydrophilic zone, corresponding to the zone which is intended to receive the formed drop. This hydrophilic zone can be formed by structuring a hydrophobic layer which has previously been deposited on the detection surface. Alternatively, the hydrophilic zone can be formed by chemical treatment, starting with hydrophobic silanes and hydrophilic silanes.

Figure 5A:
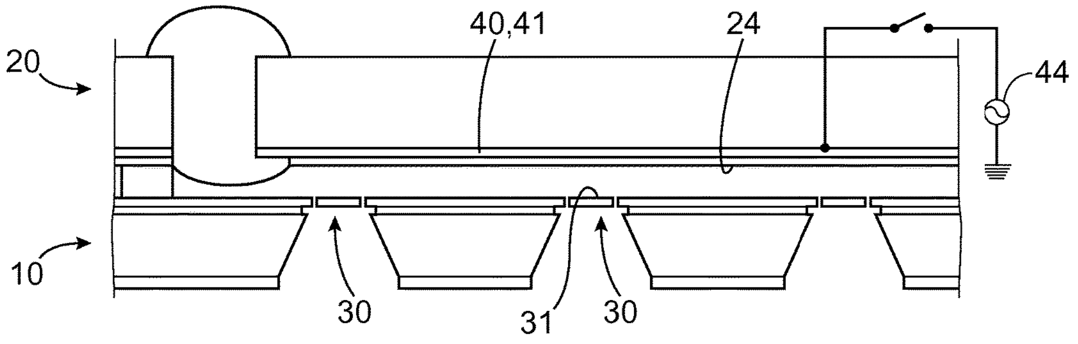
FIGS. 5A to 5C are schematic views in longitudinal cross-section of the detection device shown in FIG. 1, showing the formation of drops of liquid.

The detection device 1 according to the first preferred embodiment of the invention operates as follows, referring to FIGS. 5A to 5C.

According to a first step (FIG. 5A), the liquid of interest is put into contact with the first surface 24, from the liquid tank 25.

An oscillating, non-uniform electrical field is generated under the effect of an electrical control, by applying a suitable voltage to the two movement electrodes 40, 41.

Figure 5B:
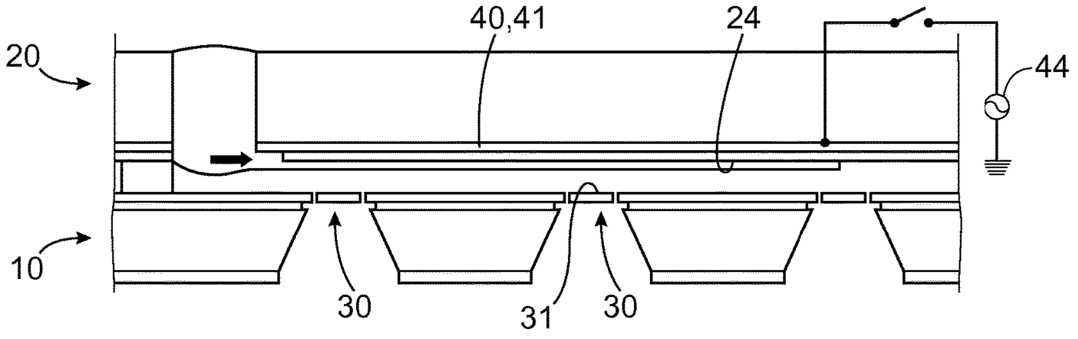
Figure 5C:
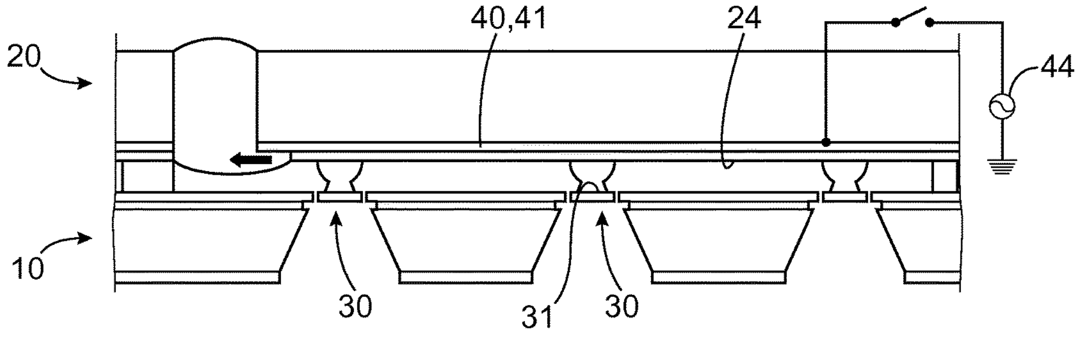

An electrostatic force is then applied to the liquid, and causes the formation of a finger of liquid on said first surface 24 by liquid dielectrophoresis (FIG. 5B).

The finger of liquid extends along the two movement electrodes 40, 41. It should be noted that the speed at which the liquid moves is high, of the order of 10 cm/s. Thus for a length of movement electrodes 40, 41 of the order of 5 mm, 50 ms are sufficient to form the finger of liquid.

The finger of liquid approximately covers the movement electrodes 40, 41 throughout their length, and its width is approximately equal to the distance 2R defined above, corresponding to the distance which separates the outer edges of the electrodes 40, 41 in their rectilinear part.

Next, when the electrical control stops (FIG. 5C), the finger of liquid breaks by capillarity into multiple drops, each on a drop formation zone.

In fact, the finger of liquid, in the absence of electrostatic force, is naturally unstable. The finger breaks under the effect of hydrodynamic instability of Rayleigh-Plateau type. In fact, this breaking of the finger into multiple drops makes it possible to reduce the surface energy of the liquid.

The instability is a competition between capillarity and inertia, and the most unstable wavelength is such that $k_{max} \cdot R = 1/\sqrt{2}$, where $k_{max}$ is the wave number. The most unstable wavelength is therefore written $\lambda_{max} = 9.016R$.

Additionally, the drop formation zones are separated from each other by a distance which approximately equals $\lambda_{max}$. The drop formation zones make it possible to deform the interface of the finger of liquid at the $\lambda_{max}$ wavelength, and thus to "preselect" the desired wavelength.

Thus the drops are formed simultaneously, and are each located in a drop formation zone.

Each drop has a calibrated volume. The volume depends on the width 2R of the finger of liquid and the distance $\lambda_{max}$ between the drop formation zones.

The drops which are formed have sufficient thickness to come into contact with the corresponding detection surface 31.

Additionally, the distance H which separates the first surface 24 and each detection surface 31, and the lateral dimensions g and w of the movement electrodes 40, 41, are adapted so that the finger of liquid has a maximum thickness which is less than the distance H, and each drop which is formed has a maximum thickness which is greater than this distance H.

The finger of liquid wets only the first surface 24, without being in contact with the detection surfaces 31. When the finger breaks, the drops which are formed come naturally into contact with said detection surfaces 31.

Each plane electromechanical oscillator 30 is set to vibrate by electrostatic coupling with the actuating electrodes, according to a predetermined frequency and a predetermined vibration mode.

Said set predetermined frequency is preferably the resonant frequency of the oscillator 30.

For this, an alternating voltage of frequency equal to the resonant frequency of the oscillator 30 is applied to the actuating electrodes, with a phase difference of $\pi$ relative to each other. Lamé's vibration mode is thus obtained.

Volume extension mode or "wine glass" mode can also be obtained, with different polarisations of actuating electrodes, as is shown in detail by international application WO2009/141515.

The effective vibration frequency of the oscillator 30 is then measured. The frequency actually depends on the mass of the drop, and if appropriate on the quantity of analytes of interest which are grafted onto the detection surface of the oscillator when the latter is made functional.

The modulation of the capacitance between the oscillator and the two measuring electrodes generates an electric current which circulates from these two electrodes.

The storage and analysis means make it possible, starting from the measurement of the electric current measured at the measuring electrodes, to determine the effective vibration frequency of the oscillator.

They calculate the divergence between the set initial frequency and the measured frequency, and deduce from it the presence of analytes of interest which are deposited on the surface of the oscillator.

Thus the method according to the invention makes it possible to detect, precisely and rapidly, the analytes of interest which may be present in the liquid.

It should be noted that the liquid is brought rapidly onto the detection surfaces.

The formation of the finger of liquid is actually very rapid, with a speed of movement of the liquid of the order of 10 cm/s. Only 50 ms are necessary to form a 5 mm finger of liquid. Additionally, the drops are formed even more rapidly, to the extent that the characteristic time of a capillarity/inertia instability is $\sqrt{\rho R^3/\sigma}$, or 0.05 ms for a liquid density $\rho = 1000$ kg/m$^3$, a half-width of finger R=50 µm and a liquid/air surface tension $\sigma = 0.072$ Nm.

Additionally, the drops are formed simultaneously and perfectly arranged on the detection surfaces. They can be of identical, calibrated volume, approximately equal to $\pi R^2 \lambda_{max}/2$.

Additionally, the liquid has only been in contact with the first surface, thus limiting to a large extent the risks of contaminating the liquid while it is routed to the detection surfaces.

In the case of the gravimetric detection of the first preferred embodiment of the invention, the liquid is in the form of drops which are arranged on the detection surfaces. In contrast to the example of the prior art described above, the oscillators are no longer immersed in the liquid. Additionally, the oscillations are no longer damped by the liquid, which preserves the intrinsic quality factor of the oscillators from all degradation of this type.

Additionally, the triple line of the drop coincides with the outline of the hydrophilic zone of the detection surface, and with the nodal lines of the vibration mode of the oscillator. It is thus on a zero movement line of the oscillator. This makes it possible to minimise the interactions between the vibrating oscillator and the liquid, the effect of said interactions being, in particular, calorific dissipation, which degrades the quality factor of the oscillator. Thus the degradation of the quality factor of the oscillator because of the presence of the drop is minimised.

It should be noted that each electromechanical oscillator can alternatively be in the form of a beam. The beam can be doubly fixed, i.e. mounted on support means at its two ends. It can also be fixed at the centre, and thus be mounted on two support means in its middle, or fixed at four points by being mounted on four support means, each arranged between the middle and an end of the beam. In the latter case, the support means are lateral beams, which are connected to the oscillator at a quarter of the vibration wavelength, and arranged at the nodes of the determined vibration mode.

According to a first variant of the first preferred embodiment of the invention, the gravimetric detection is not implemented by capacitive coupling but in a piezoelectric manner.

It should be noted that the formation of drops by breaking a finger of liquid which is formed by liquid dielectrophoresis is here identical to what is described above.

In the same way, the actuation of the electromechanical oscillators can be identical to the first preferred embodiment.

Figure 6A:
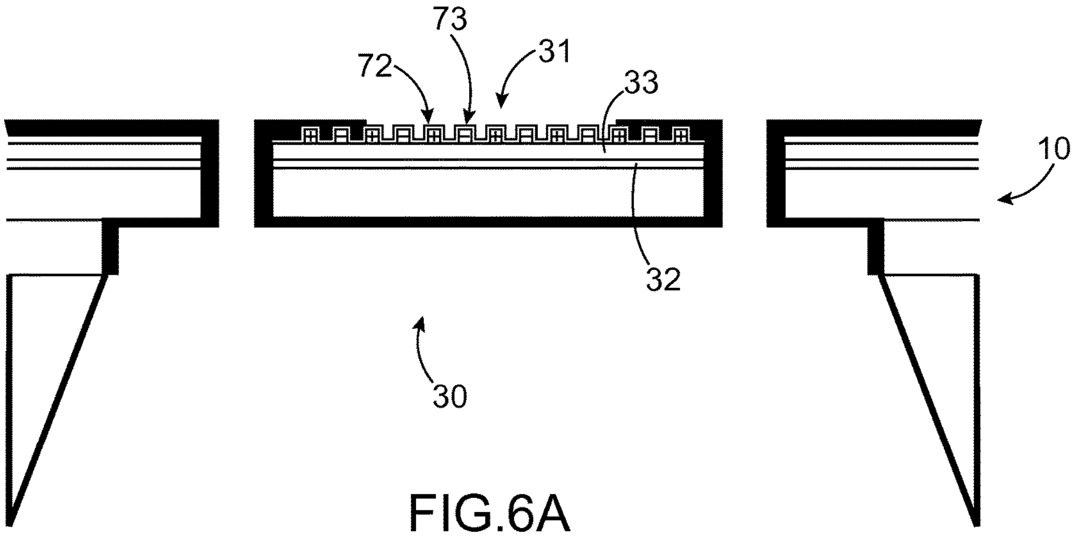
FIGS. 6A and 6B are views in transverse cross-section (FIG. 6A) and plan views (FIG. 6B) of part of the detection device according to a variant of the first preferred embodiment, in which the detection technique is piezoelectric.
Figure 6B:
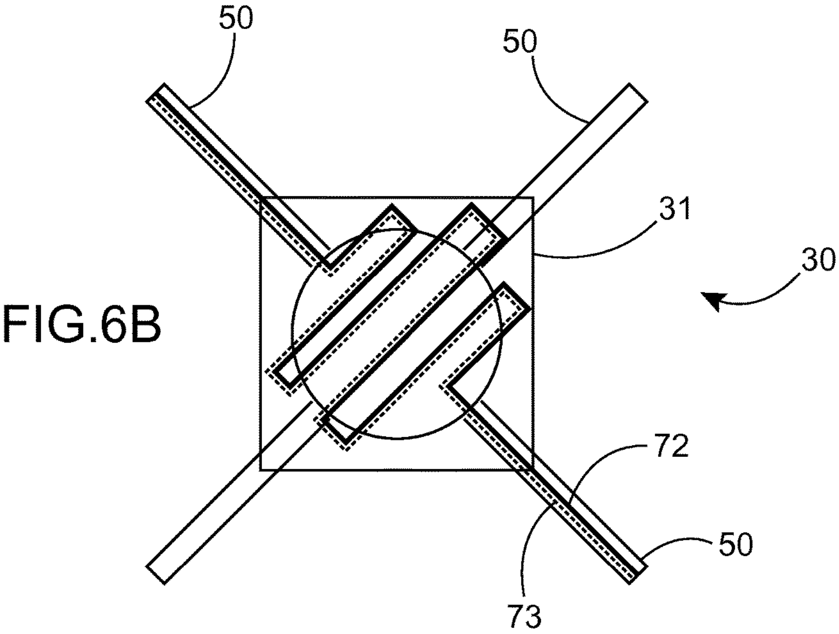

As FIGS. 6A and 6B show, said detection surfaces 31 each include a layer 32 of an electrically conductive material, which forms a reference electrode, and is implemented in molybdenum, for example.

The reference electrode 32 is covered with a layer of a dielectric piezoelectric material, e.g. aluminium nitride (AlN). This material has a crystallographic orientation <002> on the molybdenum layer. Additionally, because of this crystallographic orientation, the intensity of the electrical field generated by polarisation of the AlN layer 33 is greater for the same intensity of mechanical stress.

The AlN layer 33 is covered at least partly by two measuring electrodes 72, 73 which are brought to a constant, opposite electrical potential. The electrodes 72, 73 are metallic tracks which cross the detection surface in a zigzag, and extend on two support girders 50. They are parallel to each other and separated by a constant distance.

The measuring electrodes 72, 73 are covered with a dielectric layer.

The detection surface can have a hydrophilic zone, to make it possible to check the location of the drop on the detection surface.

When the oscillator vibrates, the AlN layer 33 is deformed and polarised. The reference electrode 32 is then brought to a determined potential via the AlN layer 33.

The variations of capacitance between the reference electrode 32 and each measuring electrode 72, 73 because of the mechanical vibrations of the oscillator cause the appearance of an electric current which circulates in the measuring electrodes 72, 73.

By measuring the electric current, the effective vibration frequency of the oscillator 30 is deduced.

It is then possible to calculate the divergence between the measured frequency and the set initial frequency, and to deduce from it the presence of analytes of interest which are deposited on the detection surface 31.

Additionally, the mechanical vibrations of the oscillator 30 induce a variation of the distance which separates the two measuring electrodes 72, 73 from each other. This variation causes a variation of the capacitance between these two electrodes 72, 73, and causes the appearance of a second electric current.

Measurement and analysis of this second electric current, in addition to those of the first current, make it possible to deduce even more precisely the effective vibration frequency of the oscillator, which makes the detection of analytes of interest even more efficient.

According to a second variant of the first preferred embodiment of the invention, each oscillator 30 of the detection device 1 forms a resonant grid, by analogy with field effect transistors.

It should be noted that the formation of drops by breaking a finger of liquid which is formed by liquid dielectrophoresis is here identical to what is described above.

In the same way, the actuation of the electromechanical oscillators is identical to the first preferred embodiment.

Figure 7:
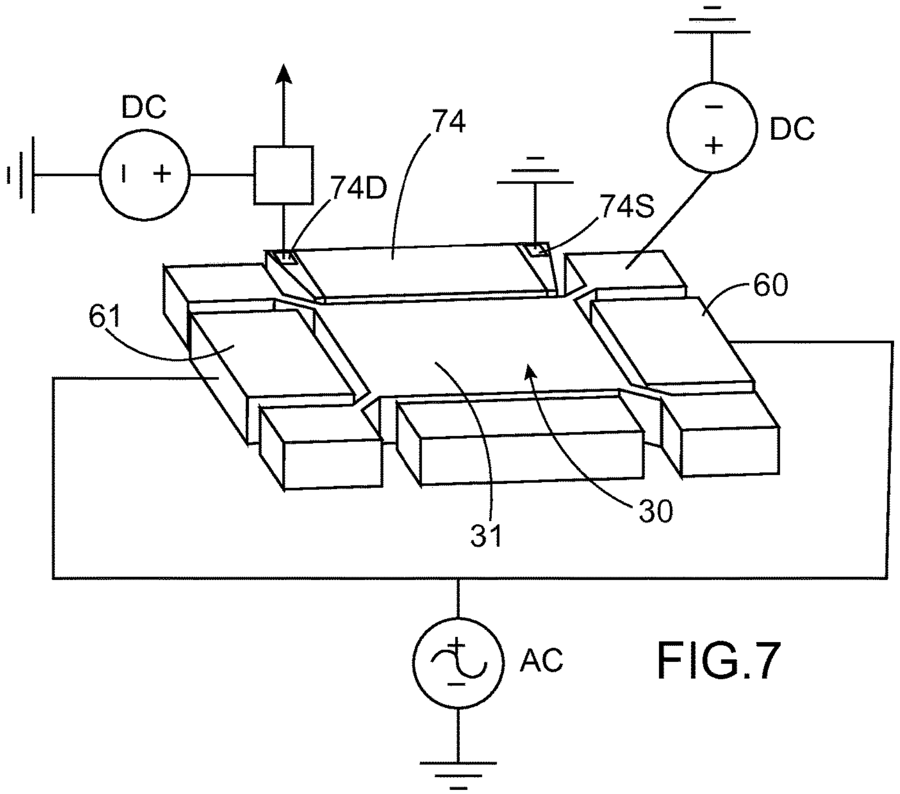
FIG. 7 is a schematic perspective view of part of the detection device according to a variant of the first preferred embodiment, in which the oscillator forms a resonant electrical grid.

As FIG. 7 shows, a measuring electrode 74 forming a channel is arranged facing the edge of said oscillator 30, preferably parallel to the latter, and advantageously coplanar with the latter, at a distance from the oscillator equal to the separation between the actuating electrodes 60, 61 and the oscillator 30, that is a few hundred nanometers.

The electrode forming a channel 74 is connected at one end to an electrode forming a source 74S, which is brought to a first constant electrical potential, and at the opposite end to an electrode forming a drain 74D, which is brought to a second electrical potential. The two electrical potentials are different. The electrode forming a channel 74 is thus subjected to a direct voltage.

The oscillator 30 can also be brought to a constant electrical potential.

When the oscillator 30 is set to vibrate at its resonant frequency, it forms a resonant grid.

The source-drain current which is generated by field effect at the resonant frequency of the oscillator which is set to vibrate, and more precisely the variations of the current, are measured. These electric current variations are induced by capacitive coupling between the oscillator 30 and the electrode forming a channel 74.

From the measurement of these variations, the presence of analytes of interest deposited on the detection surface is deduced.

According to a third variant of the first preferred embodiment of the invention, each oscillator of the detection device forms a resonant channel, by analogy with field effect transistors.

It should be noted that the formation of drops by breaking a finger of liquid which is formed by liquid dielectrophoresis is here identical to what is described above.

In the same way, the actuation of the electromechanical oscillators is identical to the first preferred embodiment.

Figure 8:
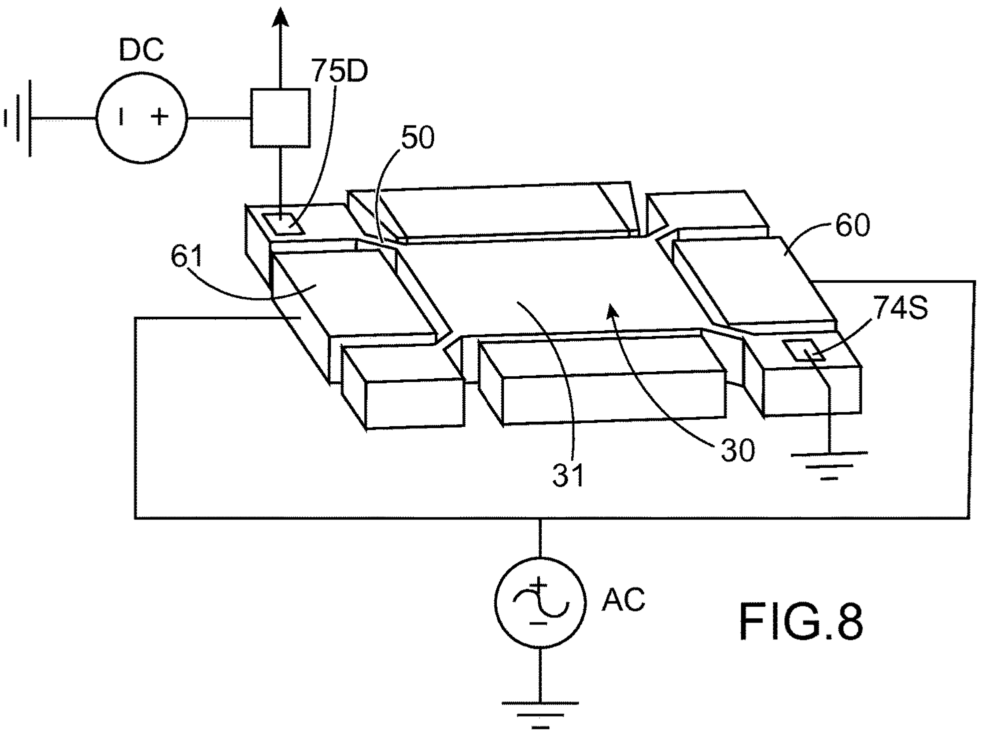
FIG. 8 is a schematic perspective view of part of the detection device according to a variant of the first preferred embodiment, in which the oscillator forms a resonant electrical channel.
Figure 9:
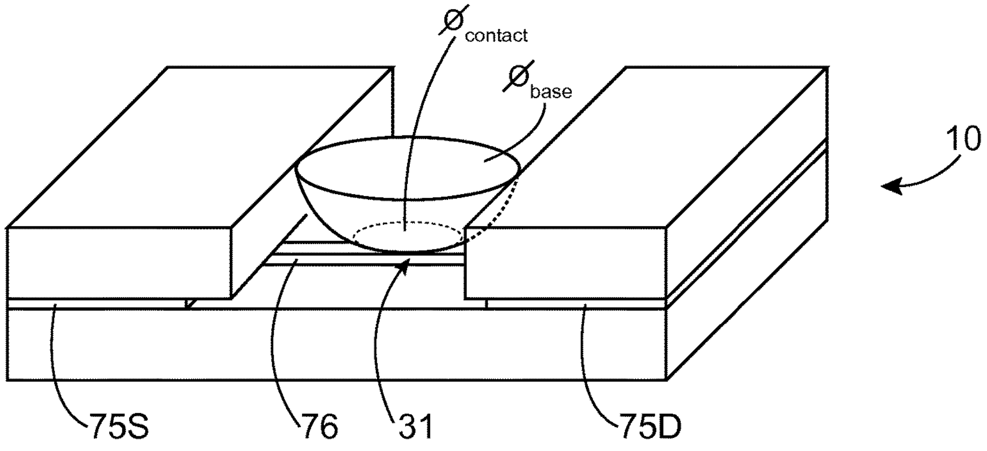
FIG. 9 is a schematic view of part of the detection device according to the second preferred embodiment, in which the detection surface includes multiple nanowires.

As FIG. 8 shows, each oscillator 30 is an electrode forming a channel, and is connected at one end to an electrode forming a source 75S, which is brought to a first constant electrical potential, and at the opposite end to an electrode forming a drain 75D, which is brought to a second electrical potential. The two electrical potentials are different. The oscillator is thus subjected to a direct voltage.

The source electrode 75S and drain electrode 75D can be arranged on the substrate 10 and connected to the oscillator 30 by electrically conducting support beams 50.

The source-drain current which circulates in the oscillator 30, and in particular the current variations which are induced by field effect by analytes of interest being deposited on the detection surface 31 of the oscillator 30, are measured.

From the measurement of these variations, the presence of analytes of interest deposited on the detection surface 31 is deduced.

According to a second preferred embodiment of the invention, the detection surface is no longer a face of an electromechanical oscillator, but a determined zone of the upper face of the lower substrate 10.

The detection surface 31 then includes multiple nanowires 76, which cover it at least partly.

The nanowires 76 are implemented in a semiconductor material, e.g. silicon or carbon in the form of nanotubes.

The nanowires 76 are each connected at one end to an electrode forming a source 75S, which is brought to a first constant electrical potential, and at the other end to an electrode forming a drain 75D, which is brought to a second constant electrical potential. Each nanowire is thus subjected to a direct electrical voltage.

By analogy with field effect transistors, the nanowires form a channel through which free carriers (electrons or holes according to the nature and the type of doping of the channel) pass.

Thus, at a given fall of source-drain potential, the current which circulates through the nanowires, and more particularly its variations induced by field effect by the presence of analytes of interest deposited on its surface, are measured. These analytes, by their charge, actually modulate the grid potential of the transistor.

Detection of the analytes of interest is thus deduced from the variations of the measured current.

The method of forming drops from a finger of liquid which is formed by liquid dielectrophoresis is identical to what is described above, and is not repeated here.

According to a third embodiment of the invention, the detection device includes a coplanar drop formation surface and detection surface.

The detection device includes a substrate 10, which includes at least one detector 30. A detector can thus be a plane electromechanical oscillator. Support means ensure that each oscillator 30 is maintained relative to the substrate 10.

Figure 10:
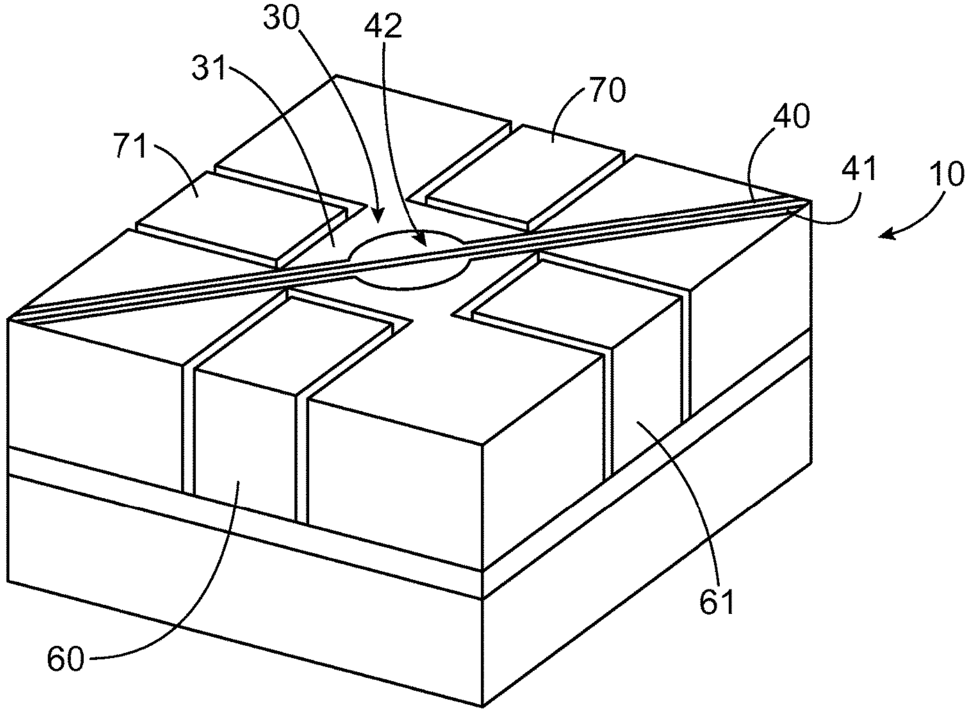
FIG. 10 is a schematic perspective view of part of the detection device according to the third embodiment of the invention, in which the drop formation surface and the detection surfaces are coplanar.

FIG. 10 shows part of such a detection device, including a single oscillator 30.

Electromechanical oscillators 10, setting them to vibrate from actuating electrodes 60, 61, and detection by gravimetry from measuring electrodes 70, 71 here are identical or similar to what has been described with reference to the first preferred embodiment of the invention.

A surface, called the principal, for forming the finger of liquid and for detection is formed of a surface of said substrate 10, a surface of said oscillator 30 forming the detection surface 31, and a surface of said support means 50.

As for the first preferred embodiment, a tank of liquid of interest (not shown) is arranged so that it can put said liquid into contact with said principal surface. The tank can be formed from an aperture which passes through the substrate and opens into the principal surface.

Two movement electrodes 40, 41 extend from said tank at the level of the principal surface. They include drop formation zones 42.

They extend on the surface of the substrate, and continue on the face of the oscillators 30 each of which forms a detection surface 31, via the support beams 50.

The method of forming the finger of liquid is identical to what is described above. The finger of liquid is formed by liquid dielectrophoresis, and extends on the substrate 10 and oscillators 30 via the corresponding support beams 50.

The drop formation zones 42 are arranged on each detection surface 31.

Thus when the electrical control stops, the finger of liquid breaks by capillarity into multiple drops, each being arranged on a drop formation zone 42, and thus on a detection surface 31 of the corresponding oscillator 30.

Each oscillator 30 is set to vibrate, preferably at its resonant frequency, by capacitive coupling with the actuating electrodes 60, 61, which are arranged facing the edge of the oscillator 30.

Analytes are detected in the drops as described with reference to the first preferred embodiment, by capacitive coupling between the oscillator 30 and two measuring electrodes 70, 71, which are arranged facing the edge of the oscillator 30.

From the measured electric current, the frequency divergence between the effective vibration frequency and the set initial frequency is deduced.

The presence of analytes of interest is detected from this calculated divergence, or as being said calculated divergence.

Of course, various modifications can be made by the person skilled in the art to the invention which has just been described, as non-limiting examples only.

As a variant of the various embodiments described above, analytes of interest can be detected by optical means which work with the detection surface.

The detection surface can be one face of a lower substrate, and include a hydrophilic part which is intended to be in contact with the drop to be analysed. This substrate, at this detection surface, can be implemented in a transparent material. The part of the substrate facing this surface is also implemented in a transparent material. This detection surface can be illuminated by a light source, and coupled to a photodetector.

The detection surface can also be similar to the surface of an electrophysiological recording sensor for ionic currents passing through cellular membranes.

The detection surface is then a porous membrane, of diameter between 100 nm and a few millimeters, the diameter of the pores being between a few nanometers and a few microns.

Such a membrane can count from one to about a hundred pores or more.

The membrane is implemented using an insulating material, e.g. silicon nitride, silicon oxide, parylene.

Because of a pressure difference between the upper face of the membrane, i.e. that which is in contact with the collected drop, and the lower face of the membrane, this face is opposite the upper face.

The coplanar substrate of the detection surface has, on said surface, an opening which acts as a fluid chamber, one of the walls of which is the lower face of the membrane.

Thus the membrane separates the collected drop from the microfluid chamber.

This microfluid chamber can be filled with a saline buffer.

A potential difference is usually applied on one side and the other of the membrane.

Preferably, pressure control means make it possible to apply, on one side and the other of the membrane, a pressure difference such that the drop is kept supported against the membrane, according to an analogous configuration to a pipette with a plane surface.

In this way, when the drop which is formed on the detection surface contains cells, the latter are agglutinated and invaginated on the membrane under the effect of the suction exerted by the pressure difference, when one exists, and under the effect of the potential difference which exists on one side and the other of the membrane, the latter effect being known by the name of attraction by electrophoresis.

Means of measuring the potential difference between two measurement points which are arranged on one side and the other of the membrane are also available.

It is known that the external envelope of the cells consists of a lipidic bilayer, which can be represented by two charged surfaces, the two surfaces being separated by a layer of insulant.

This results from the hydrophilic character of the polar heads of the lipids which form the two layers. Thus each surface of a cell can be modelled by a capacitor.

When the liquid medium in which the cells are bathed includes molecules with which the membranous proteins which are contained in the lipidic bilayer are likely to interact, the lipidic bilayer can be modified, and in particular be partly opened, and then allow ionic species to pass through the membrane between the interior of the cells and the fluid chamber, because of the potential difference which is applied on one side and the other of the membrane.

This ionic current can be quantified by the means described above for measuring the potential difference.

The invention claimed is:

1. A detection method of detecting analytes of interest which are present in a liquid of interest, the detection method comprising the following steps:

said liquid of interest is put into contact with a first surface, said first surface being parallel to and above at least one detection surface;

a finger of liquid is formed on said first surface by liquid dielectrophoresis without touching said at least one detection surface, under the effect of an electrical control, the finger of liquid extending along two approximately coplanar movement electrodes which are arranged on said first surface, said electrodes including at least one drop formation zone facing said at least one detection surface;

the electrical control is stopped, so that the finger of liquid breaks by capillarity, generating at least one downward drop on one of said drop formation zones, said at least one downward drop having a sufficient thickness to come into contact with said at least one detection surface below the drop formation zones; and said analytes of interest which are present in said at least one drop are detected by an analyte detector in communication with said at least one detection surface.

2. The detection method according to claim 1, further comprising probe elements which are capable of binding to the analytes of interest being grafted onto said at least one detection surface, in such a way as to cover it at least partly.

3. The detection method according to claim 1, said liquid movement electrodes including multiple drop formation zones, which are each arranged facing a distinct detection surface, in such a way that when the electrical control stops, the finger of liquid breaks into multiple drops, each situated on one of said drop formation zones, each drop coming into contact with the corresponding detection surface.

4. The detection method according to claim 3, said movement electrodes each including inner edges and outer edges, the inner edges being arranged approximately facing each other, and the outer edges having approximately rectilinear parts which are separated from each other by a distance 2R, and the drop formation zones being separated from each other by a distance between eight and ten times the distance R.

5. The detection method according to claim 1, said liquid movement electrodes including multiple drop formation zones which are arranged facing the same detection surface in such a way that when the electrical control stops, the finger of liquid breaks into multiple drops, each situated on one of said drop formation zones, each drop coming into contact with said same detection surface.

6. The detection method according to claim 1, said movement electrodes including a single drop formation zone which directly faces a single detection surface, in such a way that when the electrical control stops, the finger of liquid breaks into a single drop, situated on said drop formation zone, said drop coming into contact with said detection surface.

7. The detection method according to claim 1, said movement electrodes being covered with a dielectric layer.

8. The detection method according to claim 1, said first surface being hydrophobic, and said at least one detection surface being at least partly hydrophilic.

9. The detection method according to claim 1, said detection surface being a face of a plane electromechanical oscillator which is capable of vibrating.

10. The detection method according to claim 9, said detection step including the following substeps:

the oscillator is set to vibrate at a predetermined frequency and according to a predetermined vibration mode;

the effective vibration frequency of the oscillator is measured;

a divergence between the measured vibration frequency and the predetermined vibration frequency is calculated.

11. The detection method according to claim 10, wherein with at least one actuating electrode being arranged facing the edge of said oscillator, said setting of the oscillator to vibrate being implemented by electrostatic coupling between the oscillator and said at least one actuating electrode, by generating an alternating electrical field between said oscillator and said at least one actuating electrode.

12. The detection method according to claim 10, wherein with a measuring electrode being arranged facing the edge of said oscillator, said step of measuring the vibration frequency of the oscillator including measuring an electric current circulating from said measuring electrode, said electric current being generated by capacitive coupling between the oscillator and said measuring electrode.

13. The detection method according to claim 10, wherein with said at least one detection surface including a layer of an electrically conducting material which forms a reference electrode, and is covered with a layer of a dielectric piezoelectric material, the latter being covered at least partly by at least one measuring electrode, said step of measuring the vibration frequency of the oscillator including measuring an electric current circulating from said measuring electrode, said electric current being generated by capacitive coupling between the measuring electrode and the reference electrode, the latter being brought to a given electrical potential by polarisation of the piezoelectric layer because of the vibration of the oscillator.

14. The detection method according to claim 13, wherein with said piezoelectric layer being covered at least partly by two measuring electrodes, each formed of a metallic track and arranged approximately parallel to each other, said step of measuring the vibration frequency of the oscillator also including measuring a second electric current from at least one of said measuring electrodes, said second electric current being generated by capacitive coupling between said measuring electrodes.

15. The detection method according to claim 10, wherein with an electrode forming a channel being arranged facing the edge of said oscillator, said electrode forming a channel being connected to an electrode forming a source, which is brought to a first constant electrical potential, and to an electrode forming a drain, which is brought to a second electrical potential, said step of measuring the vibration frequency of the oscillator including measuring the variations of the electric current which circulates in the electrode forming a channel, said variations being induced by field effect between the oscillator and the electrode foil ling a channel.

16. The detection method according to claim 10, wherein with said oscillator being an electrode forming a channel, and being connected to an electrode forming a source, which is brought to a first constant electrical potential, and to an electrode forming a drain, which is brought to a second electrical potential, said step of measuring the vibration frequency of the oscillator including measuring the variations of the electric current which circulates in the oscillator forming a channel, said variations being induced, by field effect, by analytes of interest being deposited on the detection surface of the oscillator.

17. The detection method according to claim 9, wherein with said at least one detection surface having a hydrophilic zone which is intended to be covered by said at least one drop, the outline of the hydrophilic zone coinciding approximately with the nodal lines of the oscillator according to the vibration mode in which it is stressed.

18. The detection method according to claim 1, wherein with said detection surface including multiple nanowires, each connected to an electrode forming a source, which is brought to a first constant electrical potential, and to an electrode forming a drain, which is brought to a second constant electrical potential, said step of detecting analytes of interest including measuring the variations of the electric current which circulates in said nanowires, said variations being induced, by field effect, by analytes of interest being deposited on said detection surface.

19. A detection device, to implement the detection method according to claim 1, the detection device comprising:

a first surface and at least one detection surface, said first surface being parallel to and above said at least one detection surface and arranged at a determined distance from the latter;

a tank of liquid of interest, arranged so that said liquid can be put into contact with said first surface;

an electrical supply which forms, by liquid dielectrophoresis, a finger of liquid from said tank on the first surface, said electrical means including two approximately coplanar movement electrodes which are arranged on said first surface and include at least one drop formation zone facing said at least one detection surface; and an analyte detector which detects analytes of interest in a drop of said liquid in contact with said at least one detection surface, said analyte detector laterally adjacent to said at least one detection surface.

20. A detection method of detecting analytes of interest which are present in a liquid of interest, the detection method comprising the following steps:

said liquid is put into contact with a principal surface formed of a surface of a substrate, with a surface of a plane electromechanical oscillator forming a detection surface underneath said principal surface of the substrate;

a finger of liquid is formed on said principal surface by liquid dielectrophoresis without touching said at least one detection surface, under the effect of an electrical control, the finger of liquid extending along two approximately coplanar movement electrodes which are arranged on said principal surface, said electrodes including at least one drop formation zone, which is located above said detection surface of the oscillator;

the electrical control is stopped, so that the finger of liquid breaks by capillarity, generating at least one downward drop on one of said drop formation zones, said at least one downward drop having a sufficient thickness to come into contact with said detection surface below the drop formation zones;

said analytes of interest which are present in said at least one drop are detected by an analyte detector in communication with said at least one detection surface.

21. The detection method according to claim 20, probe elements which are capable of binding to the analytes of interest being grafted onto said at least one detection surface, in such a way as to cover it at least partly.

22. The detection method according to claim 20, wherein with said detector being a plane electromechanical oscillator which is capable of vibrating, said detection step including the following substeps:

the oscillator is set to vibrate at a predetermined frequency and according to a predetermined vibration mode;

the effective vibration frequency of the oscillator is measured;

a divergence between the measured vibration frequency and the predetermined vibration frequency is calculated.

23. The detection method according to claim 22, wherein with at least one actuating electrode being arranged facing the edge of said oscillator, said setting of the oscillator to vibrate being implemented by electrostatic coupling between the oscillator and said at least one actuating electrode, by generating an alternating electrical field between said oscillator and said at least one actuating electrode.

24. The detection method according to claim 22, wherein with a measuring electrode being arranged facing the edge of said oscillator, said step of measuring the vibration frequency of the oscillator including measuring an electric current circulating from said measuring electrode, said electric current being generated by capacitive coupling between the oscillator and said measuring electrode.

25. A detection device, to implement the detection method according to claim 20, the detection device comprising:

a substrate, at least one plane electromechanical oscillator, and a support for each oscillator relative to said substrate, a principal surface being formed of a surface of said substrate, and a surface of said oscillator forming a detection surface underneath the principal surface;

a tank of liquid of interest, arranged so that said liquid can be put into contact with said principal surface;

an electrical supply which forms, by liquid dielectrophoresis, a finger of liquid from said tank on the principal surface, said electrical means including two approximately coplanar movement electrodes which are arranged on said principal surface and include at least one drop formation zone each located above said detection surface;

an analyte detector which detects analytes of interest in a drop of said liquid in contact with said at least one detection surface, said analyte detector laterally adjacent to said at least one detection surface.

* * * * *